United States Patent [19]

Swenson

[11] Patent Number: 4,469,999
[45] Date of Patent: Sep. 4, 1984

[54] REGENERATIVE DRIVE CONTROL

[75] Inventor: Kenneth S. Swenson, Bristol, Wis.

[73] Assignee: Eaton Corporation, Cleveland, Ohio

[21] Appl. No.: 466,237

[22] Filed: Feb. 14, 1983

Related U.S. Application Data

[63] Continuation of Ser. No. 246,463, Mar. 23, 1981, abandoned.

[51] Int. Cl.³ ............................................. H02P 5/40
[52] U.S. Cl. .................................... 318/798; 318/803; 318/806
[58] Field of Search ............... 318/798, 803, 806, 424; 363/54, 58

[56] References Cited

U.S. PATENT DOCUMENTS

| | | | |
|---|---|---|---|
| 3,418,558 | 12/1968 | Morgan et al. | |
| 3,423,664 | 1/1969 | Dewey | 363/51 |
| 3,596,166 | 7/1971 | Faust | 363/54 |
| 3,609,508 | 9/1971 | Gusakovsky et al. | |
| 3,636,431 | 1/1972 | Machida et al. | 363/51 |
| 3,835,365 | 9/1974 | Ekstrom et al. | 363/51 |
| 3,842,335 | 10/1974 | Boksso | 363/54 |
| 4,005,350 | 1/1977 | Brennelsen | 363/58 |
| 4,084,221 | 4/1978 | Ogata | 363/54 |
| 4,107,771 | 8/1978 | Anderson et al. | 363/58 |
| 4,139,885 | 2/1979 | Overzet et al. | 363/58 |
| 4,197,575 | 4/1980 | Young | 363/58 |
| 4,309,735 | 1/1982 | Morris | 318/434 |

Primary Examiner—David Smith, Jr.
Attorney, Agent, or Firm—M. L. Union; C. H. Grace

[57] ABSTRACT

A regenerative drive control is connectable to an AC power source and includes a negative converter bridge (10) having an input (12, 14, 16) connectable to the AC power source and an output connectable to a DC bus, including a positive bus (18) and a negative bus (20), a load (24) having inductance and resistance and operable to generate regenerative current and direct regenerative current through the negative converter bridge to the AC power source. The negative converter bridge includes a plurality of SCR's (41, 42, 43, 44, 45, 46) arranged in a plurality of series connected pairs with each series connected pair forming a leg of the converter bridge which extends between the positive and negative buses. A gating circuit (80) is provided for sequentially gating the SCR's to establish a controllable DC output on the DC bus. Sensing means (110) for generating an inhibit signal indicative of a fault is provided. The sensing means acts to de-energize the load to prevent generation of regenerative current upon the occurrence of a fault. The sensing means also acts to prevent the gating circuit from normally sequentially gating the plurality of switchable devices to deenergize the DC output on the DC bus which is directed to the load upon the occurrence of a fault. The sensing means, upon the occurrence of a fault, actuates the gating circuit to causes the gating circuit to gate at least one of the switchable devices from a nonconductive state to a conductive state to effect the simultaneous conduction of a pair of switchable devices forming a leg of the negative converter bridge to provide a circulating path through the negative converter bridge for the inductive current of the load to enable the inductive current to exponentially decay toward zero.

28 Claims, 8 Drawing Figures

Fig. 5

REGENERATIVE DRIVE CONTROL

This is a continuation of application Ser. No. 246,463, filed Mar. 23, 1981, now abandoned.

BACKGROUND OF THE DISCLOSURE

1. Field of the Invention

The present invention relates to a regenerative drive control and more particularly to a regenerative drive control including a negative converter bridge which powers a load having inductance and resistance and wherein a circulating path is provided through the negative converter bridge for inductive current in the load to enable the inductive current to exponentially decay toward zero upon the occurrence of a fault when the normal sequential gating of the converter SCR's is inhibited.

Regenerative drive controls are well known in the art. In known regenerative drive controls which are applied to SCR phase control converter bridges operating in the negative current mode, problems are associated as a result of high current which results when the converter SCR gate pulses are inhibited while the bridge is operating into an inductive load at high continuous negative current and high average output voltage. The prior art devices are subject to loss of fuses or destruction of SCR's or other circuit components of the system as a result of the high current. The present invention prevents the loss of fuses or SCR's by diverting current to a circulating path before the current increases to catastrophic levels as a result of a fault condition.

2. Prior Art

Converters have commonly been used with DC power lines for high voltage power transmissions. Eckstrom U.S. Pat. No. 3,835,365, Machida U.S. Pat. No. 3,636,431 and Gusakowsky U.S. Pat. No. 3,609,508 all disclose examples of such a system. Ekstrom and other known prior art do not apply the converter systems to industrial drive applications where electrical power is converted to mechanical power. Such applications result in different considerations for converter system design than converter systems for high voltage power transmission due to the potential regenerating capabilities of the mechanical load. In addition, the prior art does not react fast enough to prevent a regenerative margin commutation failure as described hereinbelow. The prior art also does not disclose converter fault protection in a regenerative drive control for a negative converter bridge wherein a fast response is provided to prevent regenerative margin commutation failure and provide a by-pass path through the negative converter bridge for the inductive energy of the load.

Other fault protection systems are disclosed in the Overzet U.S. Pat. No. 4,139,885 and the Morris U.S. Pat. No. 4,309,735. Both Morris and Overzet disclose forced commutation systems which buck or force commutate the current in the converter bridge. Morris utilizes a capacitor 20 to buck current and Overzet force commutates the converter bridge using additional power components SCR 47, capacitor 48 and the charging circuit at 50. The forced commutation scheme disclosed in Overzet and Morris is undesirable because it adds components to the power circuit which can reduce reliability and increase the cost and size of the unit. The present invention overcomes the above noted problems by providing a circulating path through a pair of simultaneously conducting switching devices in a negative converter bridge for the inductive current of the load prior to the build up of the current to a destructive level to thereby enable the inductive current to exponentially decay toward zero upon the occurrence of a fault.

In a regenerative drive control where current is reversed to affect regeneration, two converter bridges are required. One bridge is called the positive converter because it can only conduct positive load current. In the positive bridge the output terminal formed by the connection of the three SCR cathodes is connected to the positive terminal of the load and the output terminal formed by the connection of the three SCR anodes is connected to the negative terminal of the load. The second bridge required is defined as the negative converter bridge since it only conducts negative (regenerative) load current. In the negative converter the SCR's are reversed in each leg of the bridge so that the SCR common anode output terminal is connected to the positive terminal of the load and the SCR common cathode output terminal is connected to the negative terminal of the load. [The foregoing definition of positive and negative converters is derived from the description of a dual converter on pages 111-113 of Thyrister Phase-Controlled Converters and Cycloconverters by Brian R. Pelly, published by Wiley Interscience.]

With respect to operation of converter bridges, the positive converter will be line commutated (also known as natural commutation) for all rated levels of SCR current and DC output voltage; that is to say that commutation of a conducting SCR will result if either (1) the next SCR in the gating sequence is gated or (2) all gating to the bridge is inhibited. For condition (1) the polarity of the AC input voltage at the time of gating is in the direction to commutate the current away from the conducting SCR and into the gated SCR. In condition (2) the AC input voltage is such that it forces the current in the conducting SCR's to zero thus commutating them. In either case, device commutation is not in question and is line commutated.

Line commutation is not guaranteed in the case of a negative converter bridge. This is the most significant difference between the positive and negative converter bridges. In a negative converter bridge there exists a level of continuous negative load current and positive bus voltage beyond which the conducting SCR will not be line commutated if gating to the bridge SCR's is lost or inhibited. Above these levels there is insufficient volt-seconds available in the portion of the line-to-line waveform above the bus voltage to force the load current to zero, thus commutating the SCR, according to the equation $$I = 0 = \frac{1}{L} \int_{T1}^{T2} (V_{AB} - V\text{ Bus})\, dt + I_o.$$

When the line-to-line voltage becomes less than the bus voltage at time $t_2$, the rate of change of load current reverses and the current is forced to destructive levels by the large voltage difference that develops between the bus voltage and the conducting AC line. The peak voltage difference is greater than 1200 V given a +600 V bus voltage and would result in a peak perspective current well beyond the negative converter bridge SCR's rating.

It is important to understand that a critical aspect of the present invention is that the gating of the switchable devices to form a circulating path must be simultaneously accompanied by the deenergizing of the regenerating load to prevent the sustained generation of a high level of negative current by the load. Without the deenergizing of the load, the gating of the switchable devices to form a circulating path would result in levels of negative circulating current which would destroy said devices.

SUMMARY OF THE INVENTION

A provision of the present invention is to provide a new and improved regenerative drive control connectable to an AC power source and including a negative converter bridge having an output connected to a DC bus and a load having inductance and resistance and operable to generate regenerative current. The negative converter bridge includes a plurality of switchable devices arranged in a plurality of series connected pairs with each series connected pair forming a leg of the negative converter bridge which extends between the positive and the negative buses. A gating circuit is provided for normally sequentially gating the plurality of the switchable devices from a non-conductive state to a conductive state to establish a controllable DC output on the DC bus. Sensing means is provided for sensing the occurrence of a fault and generating an inhibit signal in response to the fault. The sensing means is connected to the gating circuits and acts to deenergize the load to prevent generation of regenerative current thereby upon the occurrence of a fault. The sensing means directs the inhibit signal to the gating circuit to prevent the gating circuit from normally sequentially gating the switchable devices in the converter bridge and causes the gating circuit to gate at least one of the switchable devices to effect simultaneous conduction of a pair of switchable devices forming a leg of the negative converter bridge. The simultaneous conduction of a pair of switching devices provides a circulating path through the negative converter bridge for the inductive current of the load to enable the inductive current to exponentially decay toward zero, thus extinguishing the conducting switchable devices forming a leg of the negative converter bridge.

Another provision of the present invention is to provide a new and improved regenerative drive control as set forth in the preceding paragraph, further including logic means responsive to the conduction of one of the switchable devices for causing the gating circuit to gate the switchable device in series with the one conducting switchable device to effect the simultaneous conduction of a pair of switching devices forming a leg of the negative converter bridge upon the occurrence of a fault.

Still another provision of the present invention is to provide a new and improved regenerative drive control as set forth in the next preceding paragraph wherein each series connected pair of switchable devices includes one switchable device which is connected to the positive bus and another switchable device which is connected to the negative bus, and wherein the gating circuit gates, upon the occurrence of a fault, all but only effects conduction of one of all of the switchable devices which are connected to one of the buses to effect the simultaneous conduction of a pair of switchable devices forming a leg of the negative converter bridge.

A still further provision of the present invention is the provision of a new and improved regenerative drive control including a negative converter bridge having an output connected to a DC bus and a load having inductance and resistance and operable to generate regenerative current. The negative converter bridge includes a plurality of switchable devices arranged in first and second commutation groups and arranged in series connected pairs with each series connected pair forming a leg of the negative converter bridge which extends between the positive and negative buses. The drive further includes a gating circuit for normally sequentially gating the plurality of switchable devices from a non-conductive state to a conductive state to establish a controllable DC output on the DC bus and sensing means responsive to the occurrence of a fault and connected to the gating circuit for generating an inhibit signal indicative of a fault and deenergizing the load to prevent generation of regenerative current thereby. The sensing means directs the inhibit signal to the gating circuit to prevent the gating circuit from normally sequentially gating the plurality of switchable devices and is operable to actuate the gating circuit to cause the gating circuit to gate all of the switchable devices in one of the commutating groups to effect the simultaneous conduction of a pair of switchable devices forming a leg of a negative converter bridge. Simultaneous conduction of a pair of switchable devices in a leg of the negative converter bridge provides a circulating path through the negative converter bridge for the inductive current of the load to enable the inductive current to exponentially decay towards zero upon the occurrence of a fault.

DESCRIPTION OF THE DRAWINGS

FIGS. 6A, B and C are graphical representations of the time relationship of various outputs associated with the present invention. FIG. 6A represents converter output voltage and converter current upon the occurrence of a fault, FIG. 6B represents the gating and output signals associated with the logic diagram of FIG. 4 and FIG. 6C represents the gating and output signals associated with the logic diagram of FIG. 5.

DESCRIPTION OF A PREFERRED EMBODIMENT

Figure 1:
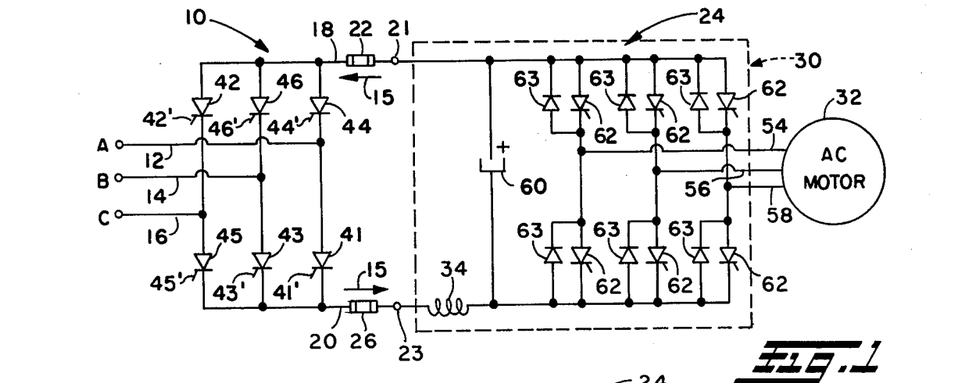
FIG. 1 is a schematic representation of the negative converter bridge of the present invention connected to a load including an inverter and an AC motor.

Referring to the Figures and more particularly to FIG. 1, a six pulse negative converter bridge 10 is illustrated which includes inputs 12, 14 and 16 for phases A, B and C, respectively, of a three-phase AC power source and output lines 18 and 20. The output line 18 is a positive DC bus and the output line 20 is a negative DC bus. The flow of negative current is indicated by the arrows 15 in FIG. 1. The DC bus 18 is connected via a fuse 22 to a positive terminal 21 of a load 24 and the negative DC bus 20 is connected via a fuse 26 to the negative terminal 23 of the load 24.

The load 24, in the embodiment disclosed in FIG. 1, is an inverter bridge 30 and an AC motor 32. The load could consist of various other items such as a DC motor as will be described more fully hereinbelow. The load 24 includes an inductance and resistance associated therewith which can be inherently part of the load 24. An inductor 34, which may be a separate inductor as illustrated or which can be integral with the load is schematically illustrated on the negative bus 20 as the inductance of the inverter bridge 30. A resistance is not illustrated as the resistance is inherent in the structure of the load 24.

Figure 4:
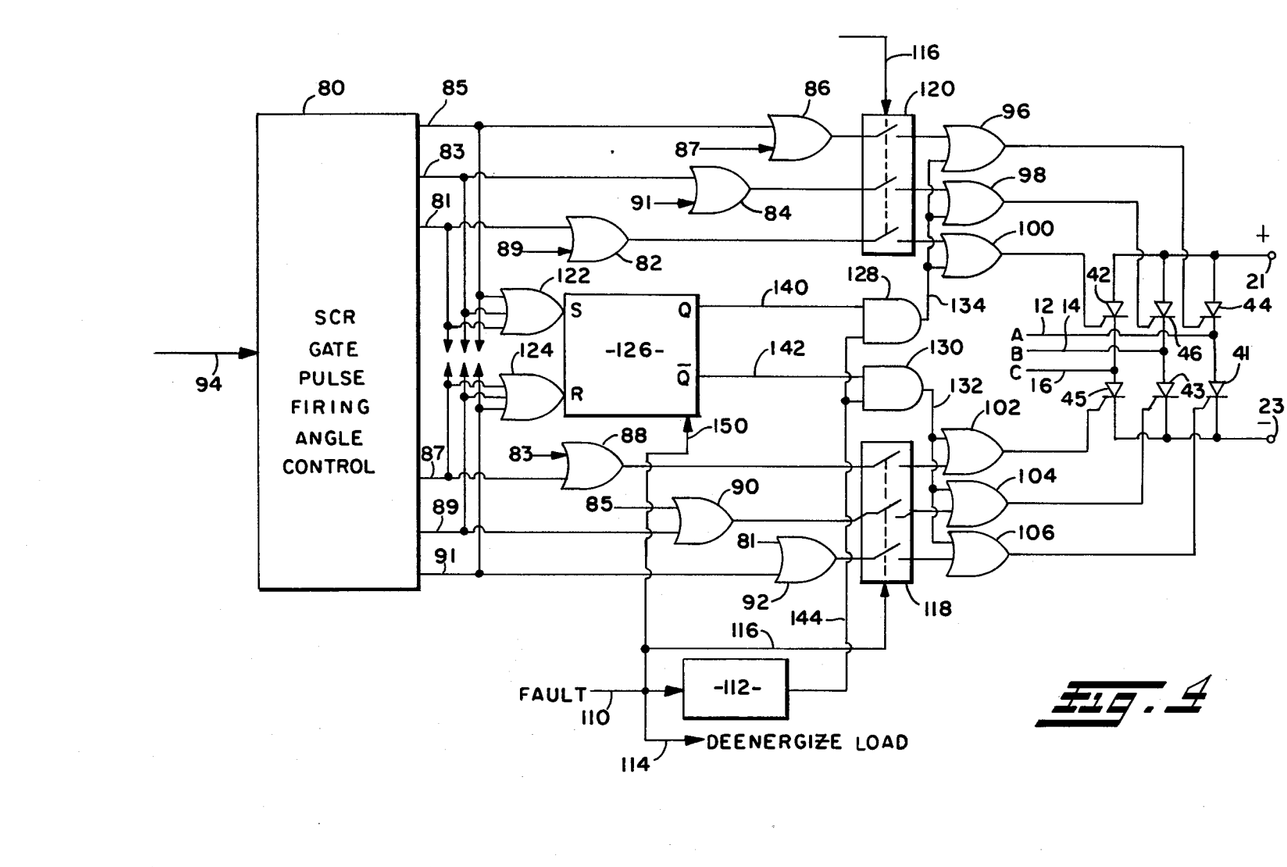
FIG. 4 is a schematic representation of logic circuitry for simultaneously firing all of the switchable devices in a commutation group of the negative converter bridge upon the occurrence of a fault.
Figure 5:
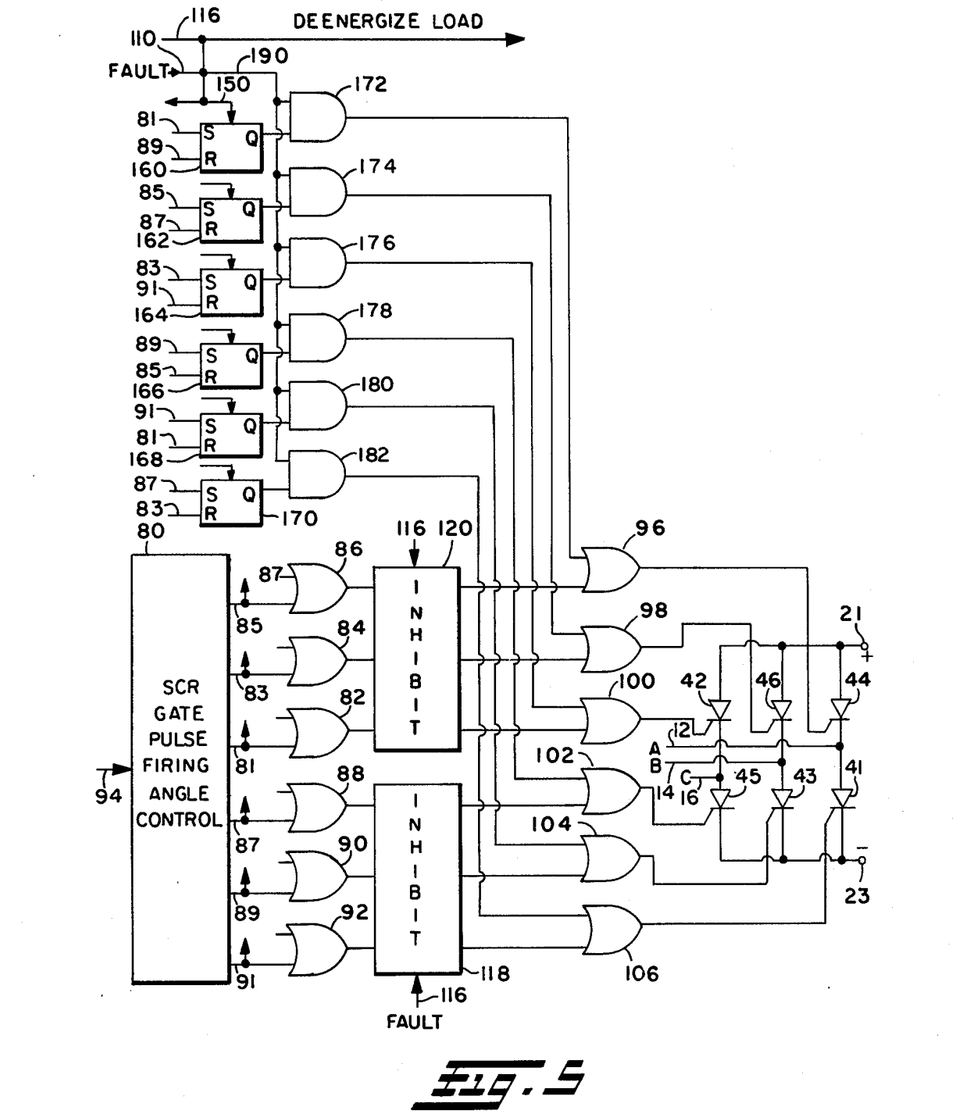
FIG. 5 is a schematic logic diagram of a logic circuit for firing a single SCR in the negative converter bridge to effect simultaneous conduction of a series connected pair of SCR's in a leg of the negative converter bridge upon the occurrence of a fault.
Figure 5A:
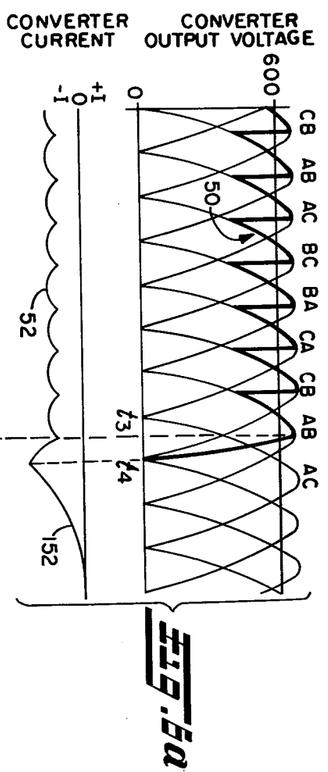
Figure 5B:
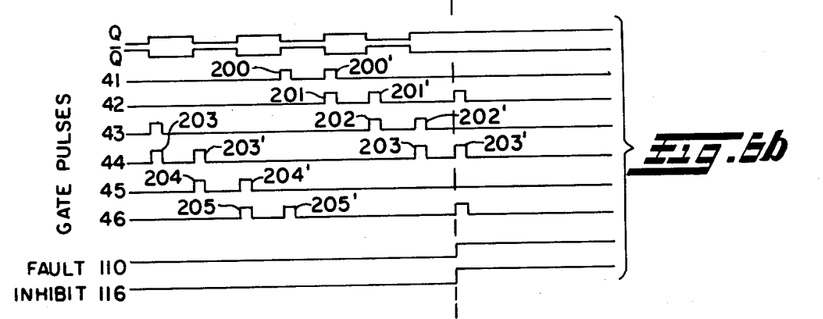
Figure 5C:
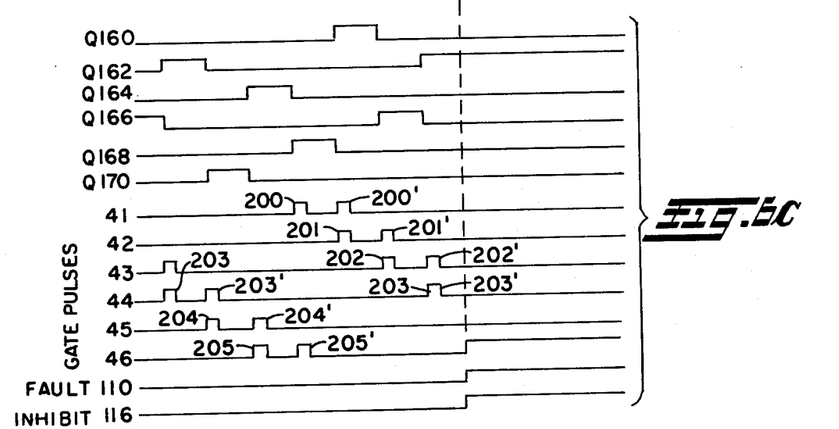

The negative converter bridge 10 includes a plurality of switchable devices which in the present instance are SCR's 41, 42, 43, 44, 45 and 46. The SCR's are arranged in series connected pairs of SCR's 42 and 45, 46 and 43, and 44 and 41. Each pair of SCR's forms a leg of the negative converter bridge extending between the positive bus 18 and the negative bus 20. Each of the SCR's include a gate terminal 41', 42', 43', 44', 45' and 46' as is well known. A suitable gating circuit 80 more fully illustrated in FIGS. 4 and 5 is provided to gate the SCR's of the negative converter bridge 10 from a nonconductive to a conductive state. As is well known in the art, the application of a gate pulse to an SCR when the potential applied to the anode is larger than the potential applied to the cathode will cause conduction of the SCR. If a gate pulse is applied to an SCR and the cathode is at a greater potential than the anode then conduction will not occur. Additionally, if an SCR is conducting and the cathode subsequently becomes positive with respect to the anode, then conduction of the SCR will be extinguished. These characteristics of SCR's are important in effecting the application of normal sequential gate pulses to the gates of the SCR's to sequentially effect conduction of various SCR's in a well knwon manner in the negative converter bridge 10.

As is well known in the art, three-phase AC voltage is applied to the inputs 12, 14 and 16. The SCR's of the negative converter bridge 10 are normally sequentially gated by the gating circuit to establish a controllable DC output between the DC buses 18 and 20 which is applied to the load 24.

Figure 3:
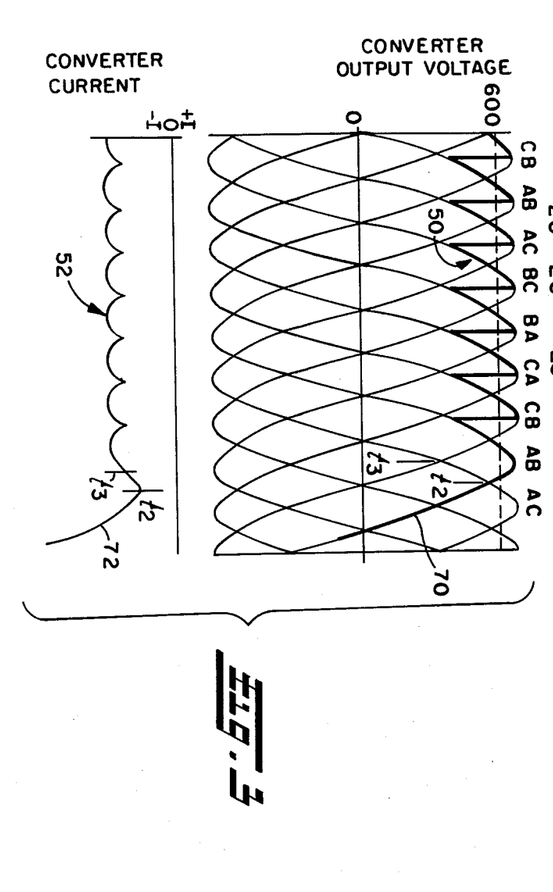
FIG. 3 is a graphic representation of prior art converter output voltage and converter current before and after the inhibiting of normal sequential gating of the SCR's without utilizing the regenerative drive control of the present invention.

The output from the negative converter bridge 10 is graphically illustrated in FIG. 3 which discloses the converter output voltage at 50 and the converter output current at 52. The converter output voltage 50 is a DC output which is comprised in a well known manner of a plurality of segments of the AC wave forms applied to the AC inputs 12, 14 and 16. These segments of the AC wave form which are combined to form the DC output are illustrated as segments CB, AB, AC, BC, BA and CA which represent the conduction between the AC inputs 12, 14 and 16. For example, CB is the segment formed when SCR's 42 and 43 are conducting, AB is the segment formed when SCR's 44 and 43 are conducting, AC is the segment formed when SCR's 44 and 45 are conducting, BC is the segment formed when SCR's 45 and 46 are conducting, and BA is the segment formed when SCR's 46 and 41 are conducting, CA is the segment formed when SCR's 41 and 42 are conducting. The normal sequential conduction of the SCR's is controlled by the gate circuit 80 in a well known manner as will be described hereinafter.

The output of the negative converter bridge 10 is applied through the fuses 22 and 26, through the filter consisting of inductor 34 and capacitor 60, to the inverter 30 which establishes a three-phase output on lines 54, 56 and 58 to effect energization of the three phase AC motor 32 in a well known manner. While a three phase output is disclosed, the output could be single phase or any other number of phases without departing from the scope of the present invention. The inverter 30 includes a plurality of SCR's 62 which form the inverter bridge and a plurality of back diodes 63. A gate circuit, which will be described hereinafter, is associated with the inverter 30. The gate circuit operates in a well known manner to sequentially gate the plurality of SCR's 62 which form the inverter bridge 30 to convert the DC input on the DC bus 18, 20 to a controllable three-phase output on the output lines 54, 56, 58 to energize and control the AC motor 32 in a well known manner. A suitable commutation circuit will also be connected to the inverter 30 to commutate the inverter SCR's 62 at appropriate times in a well known manner. A suitable commutation current, such as disclosed in the Morgan et al. U.S. Pat. No. 3,418,558 which is incorporated by reference herein, will also be connected to the inverter 30 to commutate the inverter SCR's 62 at appropriate times in a well known manner.

Figure 2:
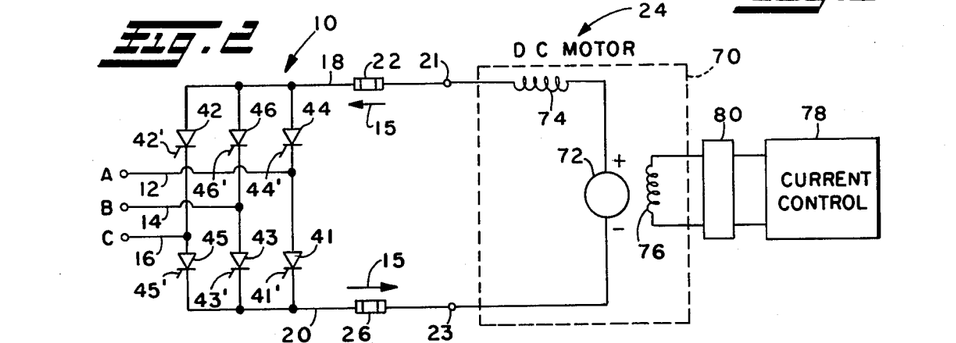
FIG. 2 is a schematic representation of the negative converter bridge of the present invention connected to a load including a DC motor.

While the present invention has been illustrated in FIG. 1 as connected to a load 24 comprising an inverter 30 and an AC motor 32, other inductive and resistive loads could be utilized with the present invention as long as the loads are capable of generating regenerative current. For example, FIG. 2 illustrates the negative converter bridge 10 having its output connected to a DC motor 70. The DC motor 70 is schematically illustrated as including an armature 72, a field 76, and a current control for the field 78. An inductor 74 is illustrated and schematically represents the inherent inductance of the DC motor 70 which will also include inherent resistance therein. A control circuit 80 is interposed between the field 76 and the current control 78 to deenergize the field 76 in response to a fault condition as will be described more fully hereinbelow. The negative converter bridge 10 operates in a well known manner to control the DC output between the buses 18 and 20 and to control the DC input to the DC motor 70.

The operation of the negative converter bridge 10 as illustrated in FIG. 1 having its output connected to a load 24 consisting of an inverter 30 and an AC motor 32 and the operation of the converter 10 disclosed in FIG. 2 having its output connected to a DC motor 70, is basically the same. In both instances the negative converter bridge 10 controls the DC potential between the DC buses 18 and 20 to control energization of the load 24 and the load includes an inherent inductance and resistance therein.

Upon the occurrence of a fault it is well known to inhibit the gate pulses from the gating circuit to the SCR's 41–46 of the negative converter bridge 10. A fault can be a variance in one of many conditions which are sensed by a fault sensing circuit, not illustrated. For example, a fault could be defined to include over-voltage, over-current, under-voltage, under current, or any other condition that a user defines as a fault.

When the converter SCR gate pulses are inhibited while the negative converter bridge 10 is operating into an inductive load at high continuous negative current and high average output voltage, the resulting high current generated may cause the destruction of fuses or SCR's. This is herein described as regenerative margin commutation failure. Regenerative margin commutation failure occurs in a six pulse negative converter bridge when there exists a high level of continuous regenerating current and bus voltage and the SCR gate drive is lost.

FIG. 3 illustrates the condition when a fault in sensed and the gate pulses to the SCR's in the negative converter bridge 10 are inhibited and there exists continuous negative current and high average output voltage. In FIG. 3 at $T_3$ a fault has been sensed and the gate pulses to the SCR's of the negative converter bridge 10 are inhibited. The inductive load 24 will cause the converter output current to continue to be forced toward zero by the instantaneous voltage between the voltage of the AC power source and the average output voltage stored on capacitor 60 until the voltage difference returns to zero. At this time the voltage difference changes polarity causing the current to increase resulting in uncontrollable fault current, as is illustrated at 72 of the converter output current graph, to pass through the negative converter bridge 10. The uncontrollable fault current will cause a regenerative margin commutation failure which cause a failure of either fuses, SCR's or other elements of the negative converter bridge 10.

In order to more fully understand the regenerative margin commutation failure illustrated in FIG. 3, assume that SCR's 44 and 43 are conducting continuous current at time $T_3$ when a fault condition is sensed. At $T_3$ subsequent SCR gate pulses from the gating circuit to the SCR's of the negative converter bridge 10 will be inhibited by the control logic which has sensed a fault condition. As a result, the current in the negative converter bridge 10 will not be transferred from conducting SCR's 43 and 44 to the next normally conductive set of SCR's which would be SCR's 44 and 45 corresponding to the wave form indicated as AC in FIG. 3. Also, for this example, assume that the bridge resistance is negligible, average converter output voltage across capacitor 60 is 600 volts, and an inductance of L, as represented by inductor 34, is present in the load 24 and that the regenerative current is continuous with a peak value $I_p$ such that $$|I_p| \frac{1}{L} \int_{T1}^{T2} (V_{AB} - 600) \, dt$$

For the example given, the voltage available ($V_{AB}$-600 volts) is insufficient to commutate the conducting SCR's 44 and 43 before time $T_2$. At $T_2$ the voltage output of the negative converter decreases below the average converter output as at 70 in FIG. 3 and the negative current begins increasing toward catastrophic levels as is illustrated at 72. This is known as a regenerative margin commutation failure and results in either a blown fuse or the destruction of one of the semiconductor elements of the circuit.

The present invention prevents regenerative margin commutation failures upon inhibiting gate pulses to the SCR's of the negative converter bridge 10 by removing the excitation of the regenerating load and by effecting simultaneous conduction of a pair of the SCR's forming a leg of the negative converter bridge to provide a circulating path through the negative converter bridge for the inductive current of the load to enable the inductive current to exponentially decay toward zero upon the occurrence of a fault. In the above example if SCR's 44 and 43 are conducting SCR 44 would be forced commutated and SCR's 46 would be turned on in series with the already conducting SCR 43 creating a back diode effect which needs only to circulate the current in the inductive load until it exponentially decays to zero. No additional current will be supplied by the now deenergized load.

In an adjustable frequency system such as disclosed in FIG. 1, wherein the load 24 is an inverter 30 and an AC motor 32, the SCR's in the negative converter bridge 10 and the fuses 22, 26 must be sized to handle a portion of the peak current of the discharging bus capacitor 60. The remainder of the discharged current passes through the parallel pairs of the inverter SCR's 63 which will be simultaneously "all fired" as more fully described hereinafter by the gate circuit to de-energize the load and prevent further generation of regenerative current by the load 24. The "all firing" occurs as the result of the occurrence of a fault and the establishment of an inhibit signal.

In cases where the load 24 is a DC motor as is illustrated in FIG. 2, the SCR's in the negative converter bridge 10 and the fuses 22 and 26 must be sized to handle any peak current which results before the motor is completely deenergized by the flux field going to zero and the counter EMF going toward zero.

The circuitry disclosed in FIGS. 4 and 5 can be utilized to effect the simultaneous conduction of a pair of SCR's in a leg of the negative converter bridge 10 to provide a circulating path through the negative converter bridge 10 for the inductive current of the load 24 upon the occurrence of a fault.

The logic diagram disclosed in FIG. 4 represents a relatively simple control system for controlling the gating of the SCR's of the negative converter bridge 10 during the occurrence of a fault. The SCR's of the negative converter bridge are arranged in two commutation groups with one commutation group comprising the even numbered SCR's 42, 44 and 46 connected to the positive bus 18 and one commutation group comprising the odd numbered SCR's 41, 43 and 45 connected to the negative bus 20. The logic circuitry disclosed in FIG. 4 simultaneously gates all of the even numbered SCR's 42, 44 and 46 in one commutation group or all of the odd numbered SCR's 41, 43 and 45 in the other commutation group to effect the simultaneous conduction of a pair of SCR's forming a leg of the negative converter bridge 10 upon the occurrence of a fault. The logic circuitry of FIG. 4 senses which pair of converter SCR's was last triggered into conduction prior to the fault and then simultaneously triggers either all of the even or all of the odd numbered converter SCR's during a fault shutdown to effect simultaneous conduction of a pair of SCR's in a leg of the negative converter bridge 10. It is necessary to trigger the proper trio of even (42, 44, 46) or odd (41, 43, 45) numbered converter SCR's to guarantee successful commutation of the SCR in the fault current path. The proper gating of the SCR's to effect the simultaneous conduction of a pair of the SCR's in a leg of the negative converter bridge 10 prevents regenerative margin commutation failure by transferring the inductive current passing through the negative converter bridge 10 from a potentially catastrophic path to a harmless exponentially decaying loop thus preventing a component failure. While FIG. 4 is described as firing three converter SCR's at once to achieve the simultaneous conduction and the desired results, one could, using a more complex logic, such as illustrated in FIG. 5 and which will be described more fully hereinbelow, fire only the single free wheeling converter SCR needed to effect the simultaneous conduction of a pair of SCR's in a leg of the negative converter bridge.

Referring to FIG. 4, a SCR gate pulse firing angle control or gating circuit 80 conditions logic circuitry including a plurality of OR gates 82, 84, 86, 88, 90, 92, 122 and 124. The SCR gating circuit 80 includes an input 94 which includes information thereon indicative of the firing angle reference. The OR gates 86, 84, 82, 88, 90 and 92 have their outputs connected through inhibit circuits 120 and 118 to inputs of the OR gates 96, 98, 100, 102, 104 and 106, respectively. OR gates 96, 98, 100, 102, 104 and 106 are connected to the gate terminals of SCR's 44, 46, 42, 45, 43 and 41, respectively. The gating circuit 80 operates during normal operation to establish normal sequential pulses and direct the pulses through the OR gates 82–92 and through the OR gates 96–106 to the gate terminals of the negative converter SCR's to effect conduction of the SCR's in a known manner. This establishes the normal voltage and current wave forms disclosed in FIG. 6 prior to time $T_3$ in FIG. 6A.

FIG. 6B illustrates the gate pulses applied to the gate terminals of SCR's 41 through 46. It can be seen in this figure that the SCR gate pulses to SCR's 41 thru 46 include pulses 200 through 205 and also a set of pulses labeled 200' through 205' which coincide in time with pulses 200–205. These pulses are generated by cross coupling the main gate pulse (200–205) to the appropriate SCR's through the OR gates 82, 84, 86, 88, 90 and 92 via lines 89, 91, 87, 83, 85 and 81 respectively. The pulses 200'–205' are required when the converter output current is discontinuous, that is, the current has returned to zero, commutating the conducting SCR's, prior to the application of the next set of gate pulses. In discontinuous current two converter bridge SCR's must be gated simultaneously to effect current conduction. During continuous current this second set of pulses 200'–205' is unnecessary because the converter bridge SCR's have not turned off prior to the occurrence of the next gate pulse.

A sensing circuit (not illustrated) is provided to sense the occurrence of a fault and establish a fault signal on line 110. The fault signal on line 110 is directed to a monostable multivibrator 112 and along lines 114, 116, and 150. Line 114 is directed to suitable circuitry to deenergize the inductive load 24. The circuitry to deenergize the load will be a gate circuit to "all fire" the SCR's 62 of the inverter 30 of the adjustable frequency drive system disclosed in FIG. 1 to deenergize the load 24 or when a DC motor 70 is the load such as illustrated in FIG. 3, the line 114 can be directed to a circuit 80 which would be operable to deenergize the field 76 of the DC motor 70. In both cases the load 24 is deenergized to prevent the generation of the regenerative current by the load. In addition, the fault signal will be directed along line 116 to actuate inhibit circuits 118 and 120. The inhibit circuits 118 and 120 include a plurality of logic gates which have been schematically illustrated as normally closed contacts which normally interconnect the OR gates 82–92 with the OR gates 96–106. Upon the application of a fault signal to line 116 the contacts or logic gates in the inhibit circuits 118 and 120 assume an open condition as is illustrated. This inhibits the further application of normal sequential gate pulses from the firing circuit 80 to the SCR's of the negative converter bridge 10. The fault signal will also be directed along line 150 to the inhibit input of flip flop 126 to inhibit further action of flip flop 126.

The control logic for firing all of the even numbered SCR's or all of the odd numbered SCR's upon the occurrence of a fault includes OR gates 122 and 124, flip flop 126 and AND gates 128 and 130. The OR gate 122 has a pulse applied thereto every time one of the OR gates 82, 84 or 86 is pulsed by the gating circuit 80 over one of the lines 81, 83 or 85. OR gate 124 has a pulse applied thereto every time one of the OR gates 88, 90 or 92 is pulsed via lines 87, 89 or 91 by the gate firing circuit 80. OR gate 122 applies a pulse to the set terminal of flip flop 126 every time one of the even numbered SCR's is fired via lines 81, 83 or 85 and OR gate 124 will apply a pulse to the reset terminal of flip flop 126 every time one of the odd numbered SCR's of the negative converter bridge 10 is fired via lines 87, 89 or 91. The application of a pulse to the set terminal of flip flop 126 will cause the Q output to go high and the $\overline{Q}$ output to go low and the application of a pulse to the reset terminal of flip flop 126 will cause the $\overline{Q}$ output to go high and the Q output to go low. Thus, flip flop 126 has a signal on its Q output or $\overline{Q}$ output which is indictive of which trio or commutation group of SCR's has last received a gate pulse.

The Q output of flip flop 126 is connected via line 140 to the input of the AND gate 128. The other input to the AND gate 128 is connected to line 144 which is the output of the monostable multivibator 112. The $\overline{Q}$ output of flip flop 126 is connected to the input of an AND gate 130 via the line 142. The AND gate 130 also has another input connected to line 144. Upon the occurrence of a fault the monostable multivibrator 112 will be actuated and line 144 will go high to condition AND gates 128 and 130 to pass the output from the flip flop 126. The output will then be applied from either the Q or $\overline{Q}$ output of flip flop 126 indicative of which of the trio or commutation group of converter SCR's was last fired. The Q and $\overline{Q}$ outputs are connected to AND gates 128 and 130, respectively, such that an output from one, when the AND gates 128, 130 are conductive upon the occurrence of a fault, will cause the associated AND gate to fire its associated commutation group of converter SCR's for the duration of the monostable multivibrator's pulse width. An output from the AND gate 128 will pass through OR gates 96, 98 and 100 to simultaneously fire the commutation group consisting of the SCR trio 42, 44 and 46 and an output from AND gate 130 will pass through OR gates 102, 104 and 106 to simultaneously fire the commutation group consisting of the SCR trio 41, 43 and 45.

When a fault signal occurs the normal gate pulses to the SCR's of the negative converter bridge 10 are inhibited by the opening of the inhibit circuits 118 and 120. A command signal is then issued to deenergize the load 24, which, in the adjustable frequency drive includes all firing the inverter 30 by a gate circuit, not illustrated but whose operation is well known in the art and which can be considered to be a part of the gating circuit 80, and in the DC drive of FIG. 2 includes removing the field excitation from the DC motor 70. Flip flop 126 is inhibited by the fault signal on line 110 upon the application of an inhibit signal to its inhibit terminal via line 150. Inhibiting of the flip flop 126 locks the flip flop 126 in its last actuated state so that its output is indicative of which trio of converter SCR's or which commutation group has been last fired. A pulse is then outputted from the monostable multivibrator 112 to enable the AND gates 128 and 130 to pass either a Q or a Q signal, respectively from flip flop 126, depending upon the condition of flip flop 126. Either AND gate 128 or AND gate 130 will fire its associated SCR trio or commutation group in the negative converter bridge 10. Firing of the trio of SCR's will cause the simultaneous conduction of a pair of SCR's in a leg of a negative converter bridge 10 to provide a circulating path through the negative converter bridge for the inductive current of the load.

FIG. 6A shows the converter voltage and current outputs corresponding to the example given and the gate pulses and outputs for the logic circuitry. At time $T_3$ a fault occurs. Assume that SCR's 43 and 44 are conducting the AB waveform as is illustrated in FIG. 6A upon the occurrence of a fault at time $T_3$. As is illustrated in FIG. 6B at time $T_3$ when a fault is sensed Q is high because the last pulse to an SCR was through the OR gate 86 to fire SCR 44. The normal sequential gate pulses are inhibited at time $T_3$ as is indicated in FIG. 6B by the inhibit signal on line 116 going high and the Q output is locked in its high state due to the application of the inhibit signal on line 116 to the inhibit terminal 150 of flip flop 126. At $T_3$ the load is deenergized by the fault signal on line 114 and the commutation group of SCR's 42, 44 and 46 is simultaneously fired by the logic circuitry. When SCR's 42, 44 and 46 are fired simultaneously, the voltages at the inputs 14 and 16 are both negative with respect to the voltage at the input 12, thereby forcing any current in SCR 44 to reduce to zero at a rate equal to $di/dt = V/L$ where L is related to the source inductance. When the current in SCR 44 equals zero it commutates, blocking any further flow of current therethrough. With SCR 44 commutated and SCR 46 conducting, the voltage across SCR 42 ($V_{CB}$) is of the polarity to reverse bias SCR 42 thus preventing it from turning on. The final result is that SCR's 43 and 46 are turned on in series and conduct the inductive current in the load 24 until it decays to zero which is graphically displayed at 152 in the current output of the converter bridge in FIG. 6A. The current waveform, which had been continuous, increases in magnitude during the time that the voltage across capacitor 60 is greater than zero because the inductance in the load will have a voltage across it. When the voltage across capacitor 60 reaches zero the current then starts to decay toward zero exponentially as is indicated at 152.

It should be appreciated that the output pulse width from the monostable multivibrator 21 must be limited to prevent any SCR's in the negative converter bridge 10 from having a gate drive applied thereto when it becomes forward biased. In FIGS. 6A and 6B SCR 42 becomes forward biased at time $T_4$. If at this time a gate signal to SCR 42 is still present while SCR's 43 and 46 are conducting in series, SCR 42 will turn on, SCR 46 will be commutated and the resulting high currents will cause a failure.

The present invention protects the SCR's of a negative converter bridge during a fault condition where immediate inhibiting of the negative converter SCR's is required. It has been found that regenerative margin commutation failure can be prevented by proper SCR gating which will transfer the inductive current passing through the negative converter bridge from a potentially catastrophic path to a harmless exponentially decaying loop thus preventing component failure. While the invention has been described in conjunction with FIG. 4 for firing three SCR's at once in a commutation group to achieve the desired results, it should be appreciated that more complex logic could be utilized to fire only the free wheeling SCR needed to cause the simultaneous conduction of a pair of SCR's in a single leg of the converter bridge to achieve the same results.

The logic system disclosed in FIG. 5 operates to fire only one SCR in series with an already conducting SCR in response to a fault condition being sensed and thus creates the resulting "back diode" path through a leg of the negative converter bridge to circulate the inductive current of the load. Comparison of the embodiments of FIGS. 4 and 5 indicate that both schemes are similar but that the selective firing of only one SCR as disclosed in FIG. 5 rather than a commutation group of SCR's requires more complex memory elements to uniquely identify the SCR to be fired. Like components of the circuits of FIGS. 4 and 5 have been labeled with like numerals. In addition, flip flops 160, 162, 164, 166, 168 and 170 perform the same basic function as the flip flop 126 of FIG. 4 and AND gates 172, 174 and 176 function similarly to AND gate 128 of FIG. 4 and AND gates 178, 180 and 182 function similarly to AND gate 130.

During normal operations of the FIG. 5 circuitry, the gating circuit 80 establishes a plurality of gate pulses which are fed through the OR gates 86-92, through the normally closed contacts of the inhibit circuits 118 and 120 and through the OR gates 96-106 to gate SCR's 41-46 in a well known manner. Each of the output pulses from the SCR gate pulse firing angle control 80 on lines 81, 83, 85, 87, 89 and 91 are directed to a set input of one of the flip flops 160-170 and each pulse sets its corresponding flip flop indicating that its associated SCR has been gated. Each flip flop 160-170 is reset when the next gate pulse from the gate circuit 80 in the firing sequence occurs. Therefore, at any one time only one of the flip flops 160-170 will be set with its output Q high. The outputs of the flip flops 160-170 are ANDed with a fault signal on line 190 in AND gates 172, 174, 176, 178, 180 and 182 in such a way that the flip flop 160-170 whose Q output is high will fire its associated AND gate and associated SCR through one of the OR gates 96-106 when the fault siganl enables the AND gates 172-182 upon the occurrence of a fault and the generation of a fault signal. The associated SCR fired will effect the simultaneous conducton of a pair of SCR's forming a leg of the negative converter bridge 10. The fired SCR will be in series with an already conductive SCR as discussed hereinabove to provide a current path through one of the legs of the negative converter 10. FIG. 6C illustrates the timing sequence for the SCR gate pulses and the logic outputs for the FIG. 5 logic diagram. For the timing diagrams illustrated in FIG. 6C it is assumed that SCR's 44 and 43 are conductive at time $T_3$ when a fault occurs. At $T_3$ flip flop 162 has a Q high output due to the fact that SCR 44 was last gated. The logic at $T_3$ will then gate SCR 46 which is in series with the already conductive SCR 43 to provide a path through one leg of the negative converter bridge for the inductive current of the load.

The present invention applies to any regenerative drive system using a negative converter bridge (one or three phase) which transfers energy in the form of an inductive current from a regenerating load to the incoming AC voltage source which is able to simultaneously deenergize the load and inhibit the normal sequential gate pulses to the negative converter bridge upon the occurrence of a fault. These systems include but are not limited to DC and adjustable frequency drive systems which include inductive and resistive elements.

From the foregoing, it should be apparent that a new and improved regenerative drive control system connectable to an AC power source has been provided. The drive control includes a negative converter bridge having an input connected to an AC power source and an output connected to a DC bus. A load having inherent inductance and resistance is connected to the DC bus and operable to generate regenerative current and direct the regenerative current through the negative converter bridge to the AC power source. The negative converter bridge includes a plurality of SCR's arranged in a plurality of series connected pairs with each series connected pair forming a leg of the negative converter bridge which extends between the positive and negative buses. A gating circuit is provided for gating the plurality of SCR's from a nonconductive to a conductive state to establish a controllable DC output to the load. Sensing means is responsive to the occurrence of a fault and connected to the gating circuit. The sensing means generates an inhibit signal upon the occurrence of a fault for de-energizing the load to prevent generation of regenerative current thereby and directs an inhibit signal to the gating circuit to prevent the gating circuit from normally sequentially gating the plurality of SCR's. The inhibit signal also causes the gating circuit to gate at least one of the switchable devices from a non-conducting to a conducting state to effect the simultaneous conduction of a pair of switchable devices forming a leg of the negative converter bridge. The simultaneous conduction of a pair of switching devices in the leg of the negative converter bridge allows the inductive current of the load to pass through the negative converter bridge to enable the inductive current to exponentially decay toward zero without destroying components of the control system.

I claim:

1. A regenerative drive control connectable to an AC power source comprising a negative converter bridge having an input connectable to the AC power source and an output connected to a DC bus including a positive bus and a negative bus, a load having inductance and resistance and responsive to the DC output on said DC bus, said load being operable to generate regenerative current and supply said regenerative current through said negative converter bridge to the AC power source, said negative converter bridge including a plurality of switchable devices arranged in a plurality of series connected pairs with each series connected pair forming a leg of said negative converter bridge which extends between said positive and said negative buses, a gating circuit for normally sequential gating said plurality of switchable devices from a non-conductive state to a conductive state to establish a controllable DC output on said DC bus which is directed to said load, and sensing means for generating an inhibit signal indicative of a sensed predetermined condition wherein it is desired to remove the conduction path from the load through the negative converter bridge to the AC power source and deenergizing said load to prevent generation of regenerative current by said load upon the occurrence of the sensed condition, said sensing means upon the occurrence of said sensed condition preventing said gating circuit from normally sequentially gating said plurality of switchable devices, said sensing means upon the occurrence of said sensed condition actuating said gating circuit to cause said gating circuit to gate at least one of said switchable devices from a non-conductive state to a conductive state to effect the simultaneous conduction of a pair of switchable devices forming a leg of said negative converter bridge, said simultaneous conduction of a pair of switching devices in a leg of said negative converter bridge providing a circulating path through said pair of simultaneously conductive switching devices in said negative converter bridge for the inductive current of said load prior to the build up of current to a destructive level as a result of commutation failure thereby enabling the inductive current to exponentially decay toward zero upon the occurrence of said sensed condition.

2. A regenerative drive control as defined in claim 1 further including logic means responsive to the gating of one of said switchable devices for causing said gating circuit to gate the switchable device in series with said one gated switchable device in response to said inhibit signal to effect the simultaneous conduction of a pair of switchable devices forming a leg of said negative converter bridge.

3. A regenerative drive control as defined in claim 2 wherein each of said switchable devices includes a gate terminal to which a potential must be applied to effect switching of said switchable device from a non-conductive to a conductive state and each of said switchable devices is operable to become non-conductive upon the application of a predetermined potential thereto.

4. A regenerative drive control as defined in claim 2 wherein each of said switchable devices is a SCR.

5. A regenerative drive control as defined in claim 1 wherein each series connected pair of switchable devices includes one switchable device connected to said positive bus and another switchable device connected to said negative bus and said gating circuit, upon the occurrence of the sensed predetermined condition, gates all of said switchable devices which are connected to one of said buses to effect the simultaneous conduction of a pair of switchable devices forming a leg of said negative converter bridge.

6. A regenerative drive control as defined in claim 1 wherein each series connected pair of switchable devices includes one switchable device connected to said positive bus and another switchable device connected to said negative bus and said gating circuit, upon the occurrence of the sensed predetermined condition, gates all but only effects switching from a non-conductive state to a conductive state of one of all of said switchable devices which are connected to one of said buses to effect the simultaneous conduction of a pair of switchable devices forming a leg of said negative converter bridge.

7. A regenerative drive control as defined in claim 6 wherein said load includes an inverter bridge including a second plurality of switchable devices and an AC motor connected to said inverter bridge.

8. A regenerative drive control as defined in claim 7 wherein said gating circuit is operable to normally sequentially direct gating signals to said second plurality of switchable devices to control the output of said inverter bridge, said gating circuit being responsive to said inhibit signal to inhibit the normal sequential gate signals to said second plurality of switchable devices and to effect the simultaneous application of gate signals to all of said second plurality of switchable devices to all fire said inverter and deenergize said AC motor to prevent said AC motor from generating regenerative current upon the occurrence of the sensed predetermined condition.

9. A regenerative drive control as defined in claim 6 wherein said load includes a DC motor connected to said negative converter bridge.

10. A regenerative drive control as defined in claim 9 further including a current control for controlling the field current in said DC motor, said current control being responsive to said inhibit signal to deenergize the field of said DC motor to prevent said DC motor from generating regenerative current upon the occurrence of the sensed predetermined condition.

11. A regenerative drive control as defined in claim 2 wherein said load includes an inverter bridge including a second plurality of switchable devices and an AC motor connected to said inverter bridge.

12. A regenerative drive control as defined in claim 11 wherein said gating circuit is operable to normally sequentially direct gate signals to said second plurality of switchable devices to control the output of said inverter bridge, said gating circuit being responsive to said inhibit signal to inhibit the normal sequential gate signals to said second plurality of switchable devices and to effect the simultaneous application of gate signals to all of said second plurality of switchable devices to all fire said inverter and deenergize said AC motor to prevent said AC motor from generating regenerative current upon the occurrence of the sensed predetermined condition.

13. A regenerative drive control as defined in claim 2 wherein said load includes a DC motor connected to said negative converter bridge.

14. A regenerative drive control as defined in claim 13 further including a current control for controlling the field current in said DC motor, said current control being responsive to said inhibit signal to deenergize the field of said DC motor to prevent said DC motor from generating regenerative current upon the occurrence of the sensed predetermined condition.

15. A regenerative drive control as defined in claim 1 further including logic means responsive to which of said plurality of switchable devices was last gated by said gating circuit prior to the occurrence of the sensed predetermined condition for gating the switchable device in series with an already conducting switchable device upon the occurrence of the sensed predetermined condition to provide the simultaneous conduction of a pair of switchable devices in a leg of said negative converter bridge.

16. A regenerative drive control connectable to an AC power source comprising a negative converter bridge having an input connectable to the AC power source and an output connected to a DC bus including a positive bus and a negative bus, a load having inductance and resistance and responsive to the DC output on said DC bus, said load being operable to generate regenerative current and supply said regenerative current through said negative converter bridge to the AC power source, said negative converter bridge including a plurality of switchable devices arranged in first and second commutation groups and arranged in series connected pairs with each series connected pair forming a leg of said negative converter bridge which extends between said positive and said negative buses, a gating circuit for normally sequential gating said plurality of switchable devices from a non-conductive state to a conductive state to establish a controllable DC output on said DC bus which is directed to said load, and sensing means for generating an inhibit signal indicative of a sensed predetermined condition wherein it is desired to remove the conduction path from the load through the negative converter bridge to the AC power source and deenergizing said load to prevent generation of regenerative current by said load upon the occurrence of the sensed predetermined condition, said sensing means upon the occurrence of the sensed predetermined condition preventing said gating circuit from normally sequentially gating said plurality of switchable devices, said sensing means upon the occurrence of the sensed predetermined condition actuating said gating circuit to cause said gating circuit to gate all of said switchable devices in one of said commutation groups to effect the simultaneous conduction of a pair of switchable devices forming a leg of said negative converter bridge, said simultaneous conduction of a pair of switchable devices in a leg of said negative converter bridge providing a circulating path through said pair of simultaneously conductive switching devices in said negative converter bridge for the inductive current of said load to enable the inductive current to exponentially decay toward zero upon the occurrence of the sensed predetermined condition.

17. A regenerative drive control as defined in claim 16 wherein one of said switchable devices in each series connected pair of switchable devices is in said first commutation group and the other of said switchable devices in each series connected pair of switchable devices is in said second commutation group.

18. A regenerative drive control as defined in claim 17 wherein the switchable devices in one of said first and second commutation groups are all connected to said positive DC bus and the switchable devices in the other of said first and second commutation groups are all connected to said negative DC bus.

19. A regenerative drive control as defined in claim 18 wherein each of said switchable devices includes a gate terminal to which a potential must be applied to effect conduction of said switchable device and each of said switchable devices is operable to become non-conductive upon the application of a predetermined potential thereto.

20. A regenerative drive control as defined in claim 19 wherein each of said switchable devices is a SCR.

21. A regenerative drive control as defined in claim 20 further including logic means responsive to the gating of one of said switchable devices for causing said gating circuit to gate all of the switchable devices in one of the commutation groups to effect the simultaneous conduction of a pair of switchable devices, including said one gated switchable devices forming a leg of said negative converter bridge.

22. A regenerative drive control as defined in claim 20 wherein said gating circuit gates, upon the occurrence of the sensed predetermined condition, all but only effects switching from a non-conductive state to a conductive state of one of all of said switchable devices in one of said commutation groups to effect the simultaneous conduction of a pair of switchable devices forming a leg of said negative converter bridge.

23. A regenerative drive control as defined in claim 22 wherein said load includes an inverter bridge including a second plurality of switchable devices and an AC motor connected to said inverter bridge.

24. A regenerative drive control as defined in claim 23 wherein said gating circuit is operable to normally sequentially direct gating signals to said second plurality of switchable devices to control the output of said inverter bridge, said gating circuit being responsive to said inhibit signals to inhibit the normal sequential gate signals to said second plurality of switchable devices and to effect the simultaneous application of gate signals to all of second plurality of switchable devices to all fire said inverter and deenergize said AC motor to prevent said AC motor from generating regenerative current upon the occurrence of the sensed predetermined condition.

25. A regenerative drive control as defined in claim 22 wherein said load includes a DC motor connected to said negative converter bridge.

26. A regenerative drive control as defined in claim 25 further including a current control for controlling the field current in said DC motor, said current control being responsive to said inhibit signal to deenergize the field of said DC motor to prevent said DC motor from generating regenerative current upon the occurrence of the sensed predetermined condition.

27. A regenerative drive control as defined in claim 18 further including logic means responsive to which of said plurality of switchable devices was last gated by said gating circuit prior to the occurrence of a fault for enabling the gating of all of the switchable devices in one of said commutation groups upon the occurrence of a fault to effect the simultaneous conduction of a pair of switchable devices in a leg of said negative converter bridge.

28. A regenerative drive control as defined in claim 27 wherein said gating of all of the switchable devices in one of said commutation groups upon the occurrence of a fault effects switching from a nonconductive state to a conductive state of one of all of said switchable devices in said one commutating group, said one switching device which is rendered conductive being in series with an already conductive switchable device to effect the simultaneous conduction of a pair of switchable devices forming a leg of said negative converter bridge.

* * * * *